US008474648B1

(12) United States Patent
Ritzen

(10) Patent No.: US 8,474,648 B1
(45) Date of Patent: Jul. 2, 2013

(54) THERMOS AND CUP COMBINATION

(75) Inventor: Cynthia Ritzen, Floresville, TX (US)

(73) Assignee: BIC Corporation, Shelton, CT (US)

( * ) Notice: Subject to any disclaimer, the term of this patent is extended or adjusted under 35 U.S.C. 154(b) by 2266 days.

(21) Appl. No.: 11/324,640

(22) Filed: Jan. 3, 2006

Related U.S. Application Data

(60) Provisional application No. 60/641,068, filed on Jan. 3, 2005.

(51) Int. Cl.
A47J 41/02 (2006.01)
B65D 81/38 (2006.01)

(52) U.S. Cl.
USPC .......... 220/592.17; 220/4.26; 220/23.83; 220/212; 220/379

(58) Field of Classification Search
USPC .......... 220/592.17, 4.26, 4.27, 4.21, 23.86, 220/23.83, 212, 379, 713
See application file for complete search history.

(56) References Cited

U.S. PATENT DOCUMENTS

| 3,618,807 | A | | 11/1971 | Rownd | |
|---|---|---|---|---|---|
| 3,705,661 | A | * | 12/1972 | Davis | 215/6 |
| 4,061,244 | A | * | 12/1977 | Tucker | 220/212 |
| 4,215,785 | A | * | 8/1980 | Schwaiger | 215/11.6 |
| 4,585,134 | A | * | 4/1986 | Miyaji et al. | 215/398 |
| 4,792,994 | A | * | 12/1988 | Aylward | 455/344 |
| 5,086,926 | A | * | 2/1992 | Paige et al. | 206/542 |
| 5,123,558 | A | * | 6/1992 | Moloney | 220/212 |
| 5,273,182 | A | * | 12/1993 | Laybourne | 220/740 |
| 5,299,705 | A | | 4/1994 | Dettmar | |
| D386,950 | S | * | 12/1997 | Dettmar | D7/608 |
| 6,032,481 | A | * | 3/2000 | Mosby | 62/457.2 |
| 6,089,519 | A | * | 7/2000 | Laybourne | 248/346.11 |
| 6,126,024 | A | | 10/2000 | Ramirez et al. | |
| 6,530,496 | B2 | * | 3/2003 | Moran | 220/603 |
| D479,785 | S | * | 9/2003 | Schuler | D7/629 |
| D503,589 | S | * | 4/2005 | Schuler | D7/608 |
| 2001/0010314 | A1 | * | 8/2001 | Goto et al. | 220/674 |
| 2001/0023693 | A1 | * | 9/2001 | Kwon | 126/263.01 |
| 2005/0139597 | A1 | * | 6/2005 | O'Neill | 220/254.1 |
| 2005/0211712 | A1 | * | 9/2005 | Moran | 220/592.17 |
| 2008/0179335 | A1 | * | 7/2008 | Lee et al. | 220/592.17 |

* cited by examiner

Primary Examiner — Mickey Yu
Assistant Examiner — Niki Eloshway
(74) Attorney, Agent, or Firm — Taft Stettinius & Hollister LLP; Keith Swedo

(57) ABSTRACT

The drink ware system of the present invention comprises a vessel, stopper, cup, and lid. The vessel includes a first end, mouth located at the first end, second end, first and second mechanical connections, and body comprised of an inner and outer surface. The body of the vessel stores liquids that are deposited through the vessel's mouth. The stopper engages the mouth to prevent the liquids being stored from escaping. The cup is comprised of an outside surface, inside surface forming a cavity, and opening having a third mechanical connection. The cup is removably coupled to the first end of the vessel such that the cavity encloses the mouth and stopper. The lid has a fourth mechanical connection and can be removably coupled to the second end of the vessel and the opening of the cup when the cup and the lid are decoupled from the vessel.

25 Claims, 9 Drawing Sheets

THERMOS AND CUP COMBINATION

This application claims priority from U.S. Provisional Application Ser. No. U.S. 60/641,068 filed Jan. 3, 2005.

BACKGROUND

The present invention relates to drink ware systems and more specifically to a thermos and cup combination.

Drink ware systems are known in the art and are used to carry and insulate liquids. A thermos is one common form of drink ware system. Thermoses generally have inner and outer surfaces separated by insulating material and an opening at one end that allows liquid to be deposited into and out of the thermos. A stopper is usually placed over the opening of the thermos to prevent any unwanted spilling of the liquid contained therein. Cups are also known to be coupled to the thermoses such that they cover the stopper and opening. The cups may be removed and used to drink the liquid.

It is desirable to provide a cup with a larger capacity for liquid. It is also desirable to have a lid for the cup to prevent unwanted spilling of liquid contained therein. It is further desirable to have a lid coupled to a different end of the thermos than the cup. It is still further desirable to have a lid with a lip around a flat cover. Lastly it is desirable to provide an engagement system that includes all of the above features. While various drink ware systems have been developed, there is still room for improvements. Thus, a need persists for further contributions in this area of technology.

DETAILED DESCRIPTION OF A SPECIFIC EMBODIMENT

Figure 1:
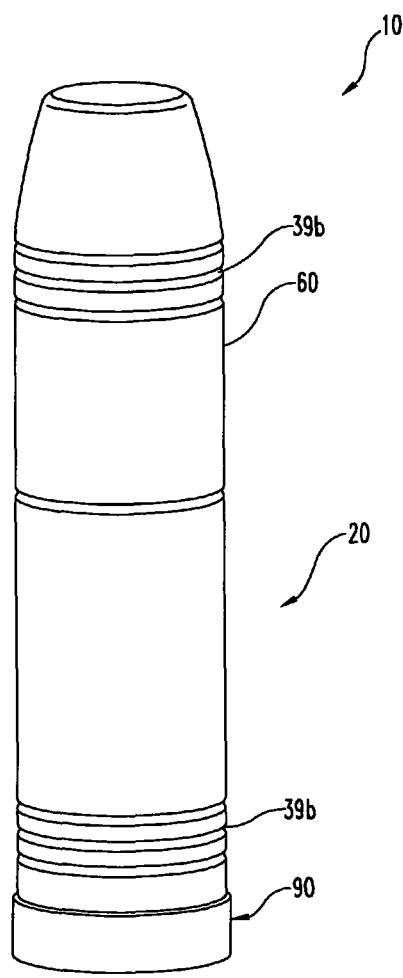
FIG. 1 is a perspective view of the drink ware system 10 where the cup 60 and the lid 90 are coupled to the thermos bottle 20.

For the purpose of understanding of the principles of the invention, reference will now be made to the embodiments illustrated in the drawings and specific language will be used to describe the same. No limitation of the scope of the invention is intended by the embodiments illustrated in the drawings or specific language used to describe the same. Any alterations or modifications of the described embodiments and any further applications of the principles of the invention described herein are contemplated as would occur to one skilled in the art to which the invention relates.

Figure 2:
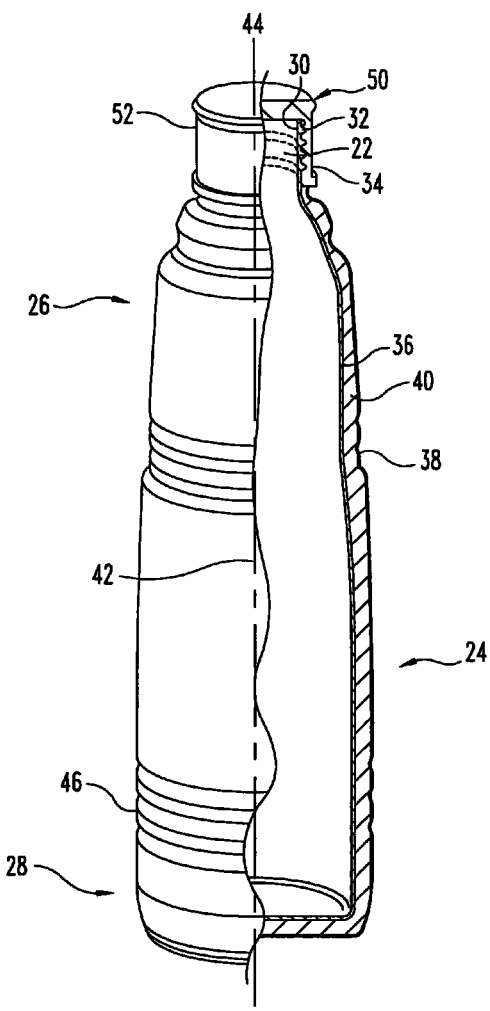
FIG. 2 is a perspective cut-away view of the thermos bottle 20 after cup 60 and lid 90 are decoupled.
Figure 3:
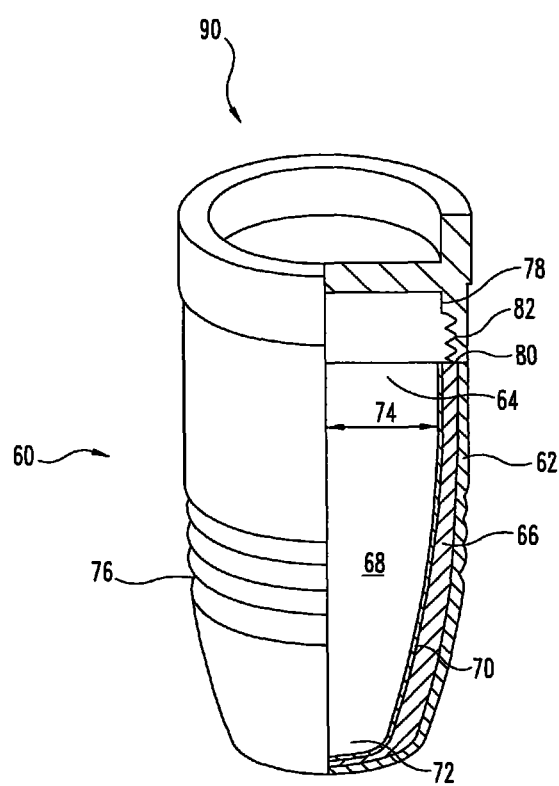
FIG. 3 is a perspective cut-away view of the cup 60 and the lid 90 coupled to one another.

FIGS. 1 and 2 illustrate a drink ware system 10 according to one embodiment of the current invention. The drink wear system 10 includes a thermos bottle 20, a stopper 50, a cup 60, and a detachable lid 90. It should be appreciated that the components of system 10 may be made of metal, polymers, rubber, ceramic, wood, stone, or any other water impermeable material or combination thereof as may occur to one skilled in the art. The several components may be made of the same or different materials.

The thermos bottle 20 has a mouth 22, a body 24, a first end 26, and a second end 28. The mouth 22 is located at the first end 26 of the thermos bottle 20 and includes an inner surface 30 and an outer surface 32. The outer surface 32 of the mouth 22 includes threads 34 on the outer surface 32 that are engaged by the stopper 50 to prevent liquid contained within the body 24 from escaping. In other versions, the inside surface 30 and outside surface 32 of the mouth 22 may include a frictional engagement means, a recessed engagement means, a raised engagement means, a mechanically interlocking feature, or any other engagement means, features, or combination thereof as may occur to one skilled in the art.

The body 24 includes an inside surface 36 and an outside surface 38. In one version, the inside surface 36 is generally composed of plastic while the outside surface 38 is composed of metal. In other versions the inside surface 36 and the outside surface 38 may be made of metal, polymers, rubber, ceramic, wood, stone, or any other rigid material or combination thereof as may occur to one skilled in the art. In still other versions, the inside surface 36 and the outside surface 38 may or may not be of the same or different material. The inside surface 36 and the outside surface 38 are separated by a space 40. In one version, the space 40 contains air or other gas. In another version, the space 40 contains foam. It should also be appreciated that the space 40 may contain glass, wood, air, a vacuum, a liquid, a gelatinous material, a polymeric material, a wood, a metal, a fiberglass, or any other insulating material or combination thereof as may occur to one skilled in the art. The inside surface 36 and the outside surface 38 may not be separated by a space 40.

Figure 6:
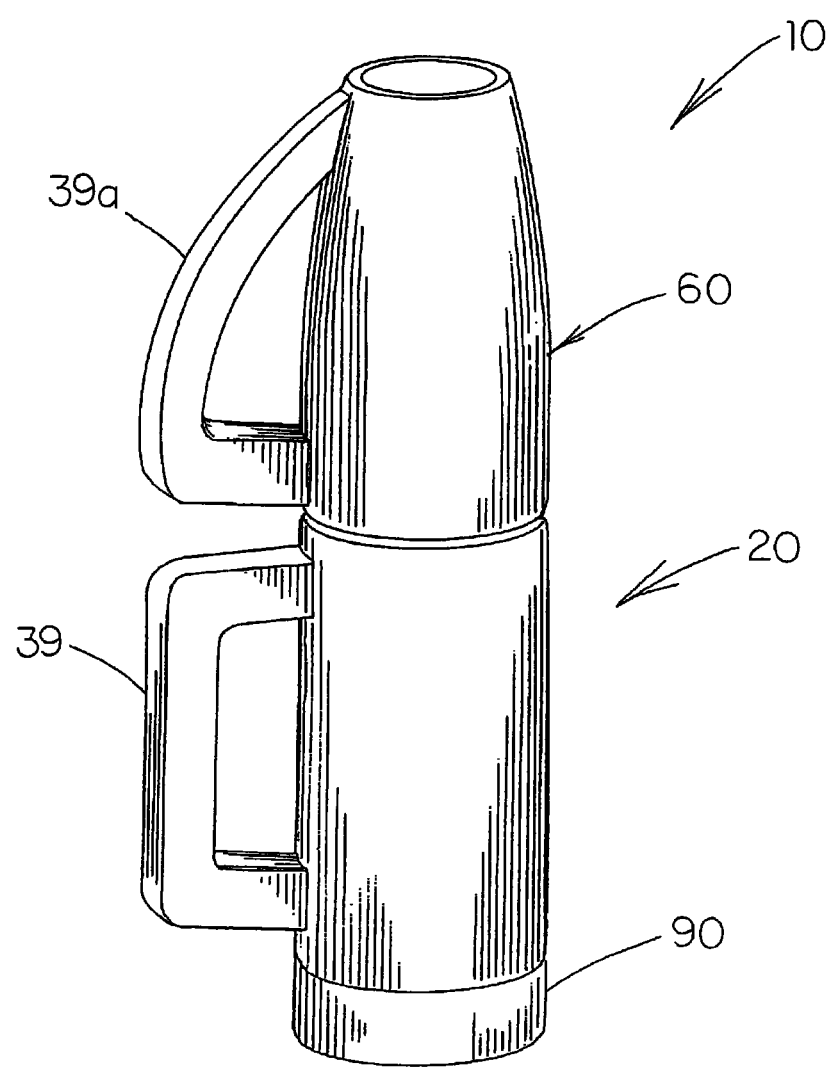
FIG. 6 is a perspective view of the thermos bottle 20 and the cup 60 having handles 39, 39a as gripping means 46, 76 located thereon.
Figure 7:
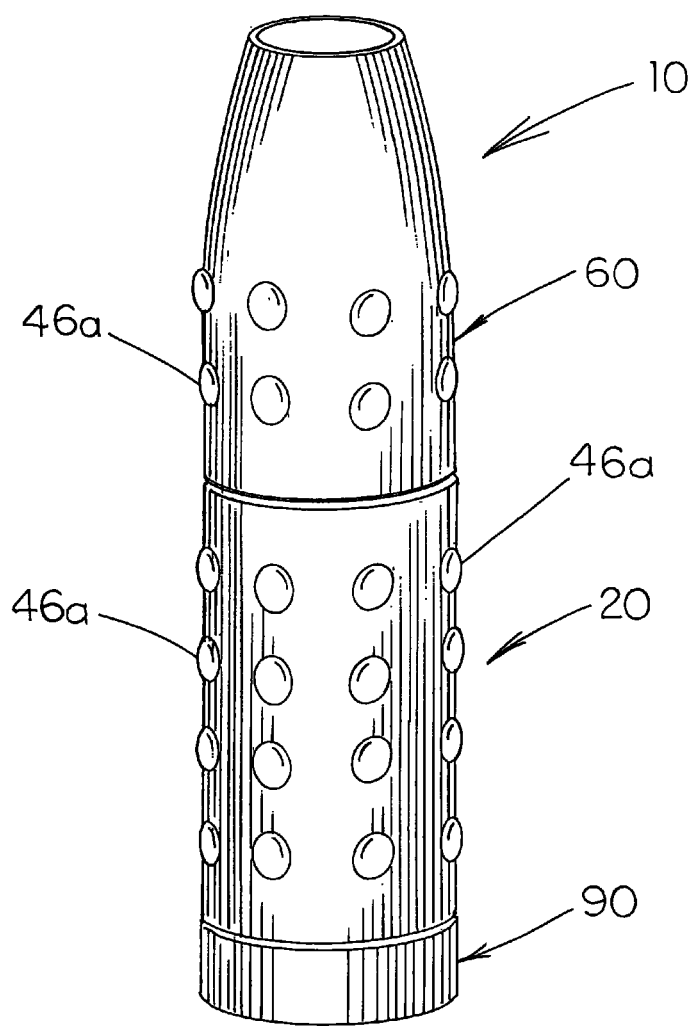
FIG. 7 is a perspective view of the thermos bottle 20 and the cup 60 having surface projections 46a as gripping means 46 located thereon.
Figure 8:
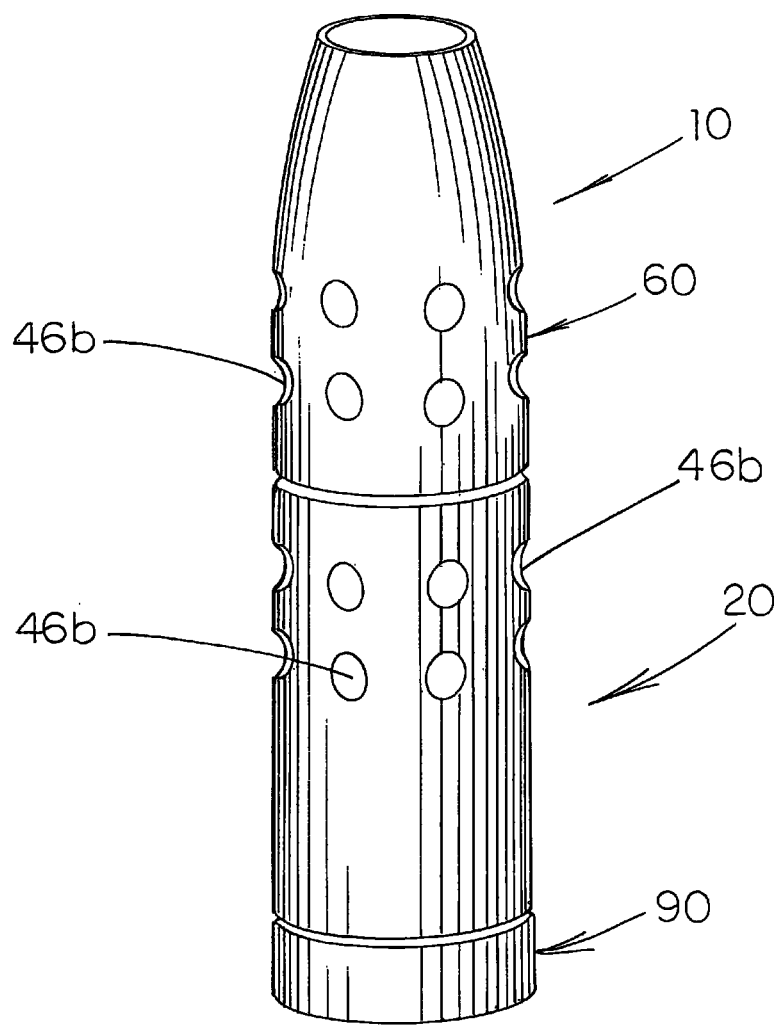
FIG. 8 is a perspective view of the thermos bottle 20 and the cup 60 having surface recessions 46b as gripping means 46 located thereon.
Figure 9:
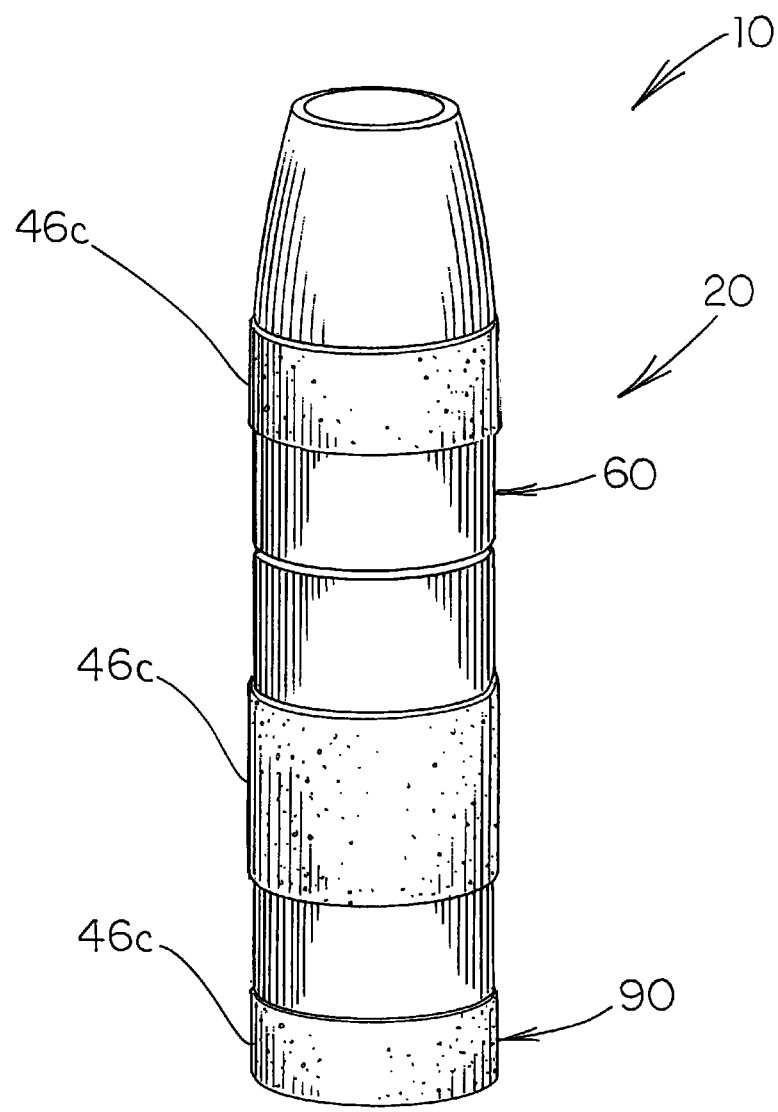
FIG. 9 is a perspective view of the thermos bottle 20 and the cup 60 having sleeves 46c as gripping means 46 located thereon.
Figure 10:
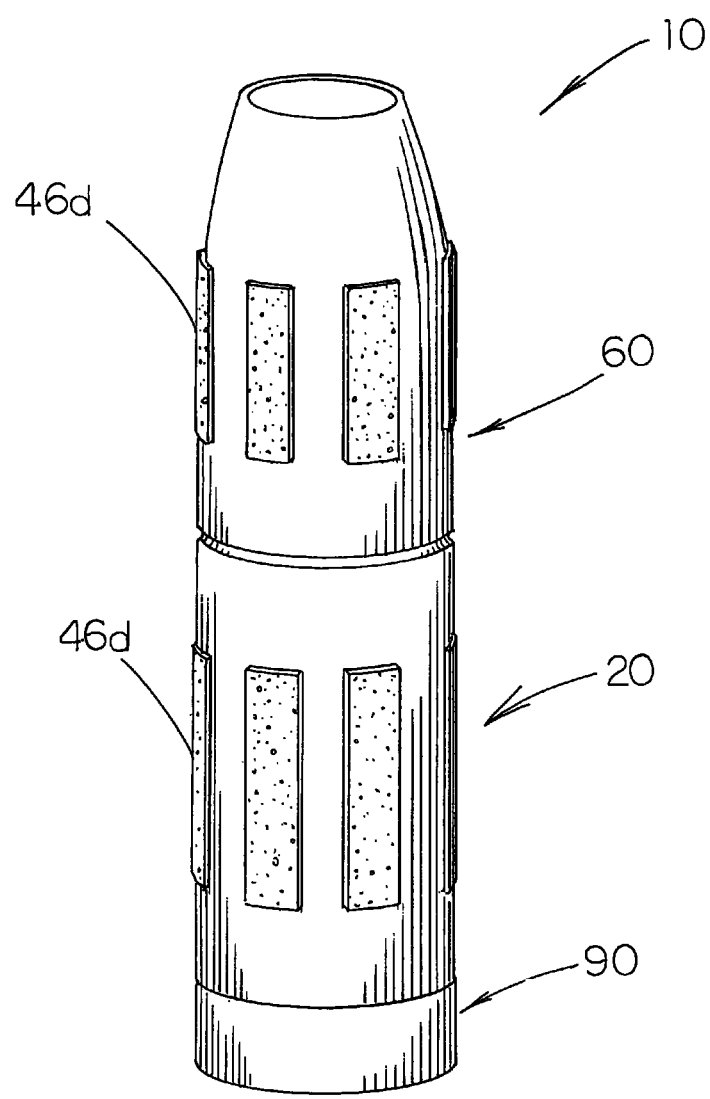
FIG. 10 is a perspective view of the thermos bottle 20 and the cup 60 having strips 46d as gripping means 46 located thereon.

The thermos bottle 20 has a generally tapering shape starting from about the midpoint 42 of its longitudinal axis 44 and tapering toward the first end 26. In other versions, the thermos bottle 20 may be compact, curved, triangular, shaped as a pyramid, cylindrical, cubic, rectangular, or any other configuration as would normally occur to one skilled in the art. The inside surface 36 and the outside surface 38 may comprise generally smooth surfaces as shown in FIG. 1. The outside surface 38 may include at least one gripping means 46 located on the outer surface 38 such as a handle 39 as shown in FIG. 6, annular recessions 39b as shown in FIG. 1, surface projections 46a as shown in FIG. 7, surface recessions 46b as shown in FIG. 8, a sleeve 46c having a larger coefficient of friction than that of the body 24 as shown in FIG. 9, strips 46d having a larger coefficient of friction than that of the body 24 as shown in FIG. 10, or any other gripping means or combination thereof that may occur to one skilled in the art.

The stopper 50 is in the shape of a cylindrical cap 52 that threadedly engages the outer surface 32 of the mouth 22. In other versions, the stopper 50 may have a triangular, rectangular, spherical, pyramid, cubic, a flat solid cylinder or circle shape that is held in place over mouth 22, or any other sealing means or combination thereof as may occur to one skilled in the art. The stopper 50 may engage outer surface 32 of mouth 22 frictionally, threadedly, or by mechanically interlocking. The stopper 50 may alternately engage the inner surface 30 of the mouth 22 or body 24 frictionally, threadedly, by mechanically interlocking, or any other engagement means or combination thereof as may occur to one skilled in the art. The stopper 50 may alternately be made of polymers, wood, rubber, metal, ceramic, stone, or any other sealing material or combination thereof as may occur to one skilled in the art.

The cup 60 has an outside surface 62, an opening 64, and an inside surface 66 that forms a cavity 68 suitable for containing a liquid. The cup 60 may alternately be a tumbler, bowl, mug, vessel, or any other detachable component as would normally occur to one skilled in the art. The inside surface 66 and the outside surface 62 of the cup 60 may be separated by a space 70. In one version, the space 70 contains air. In another version, the space 70 contains foam. In still other versions, the space 70 may contain other insulating materials such as wood, a vacuum, liquid, gelatinous materials, polymeric materials, wood, metal, fiberglass materials, or any other insulating material or combination thereof as may occur to one skilled in the art. The inside surface 66 and the outside surface 62 may alternately not be separated by a space.

The cavity 68 is generally made of plastic while the outside surface 62 is made of metal. In other versions the cavity 68 and the outside surface 62 may be made of metal, rubber, ceramic, wood, stone, polymers, or any other rigid material or combination thereof as may occur to one skilled in the art. In still other versions the cavity 68 and the outside surface 62 may or may not be made of the same material. The cup 60 can be tapered from the bottom 72 of the cavity 68 to the opening 64. The cup 60 is shaped to allow cup 60 to fit over the stopper 50 and the mouth 22 and to be secured to the outside surface 28 of the body 24. The internal diameter 74 of the cup 60 may remain constant or may vary.

The outside surface 62 is generally smooth and includes no gripping means 76. In other versions the outside surface 62 of the cup 60 may include at least one gripping means 76 located on outside surface 62 such as a handle 39a as shown in FIG. 6, annular recessions 39b as shown in FIG. 1, surface projections 46a as shown in FIG. 7, surface recessions 46b as shown in FIG. 8, a sleeve 46c having a larger coefficient of friction than that of the body 24 as shown in FIG. 9, strips 46d having a larger coefficient of friction than that of the body 24 as shown in FIG. 10, or any other gripping means or combination thereof that may occur to one skilled in the art.

Figure 5:
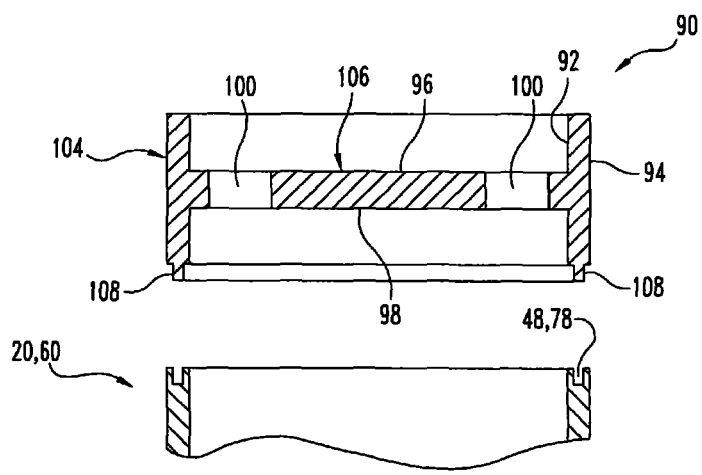
FIG. 5 is a side sectional view of the lid 90 according to one version of the invention.

The opening 64 includes an inner surface 78 and an outer surface 80. The inner surface 78 includes threads 82 that engage the mouth 22 of the thermos bottle 20 to removably couple the cup 60 to the thermos bottle 20. The inner surface 78 or the outer surface 80 of the opening 64 may removably couple the cup 60 to the thermos bottle 20 by engaging the mouth 22 and/or body 24 frictionally, threadedly, by mechanically interlocking, or any other coupling means or combination thereof as may occur to one skilled in the art. The opening 64 may include a recessed or projected surface 78 at the distal end of the opening 64 located between the inner surface 78 and the outer surface 80 that engages a projected or recessed surface 48 respectively of the mouth 22 and the body 24 as shown in FIG. 5 frictionally, threadedly, by mechanically interlocking, or any other coupling means or combination thereof as may occur to one skilled in the art.

Figure 4:
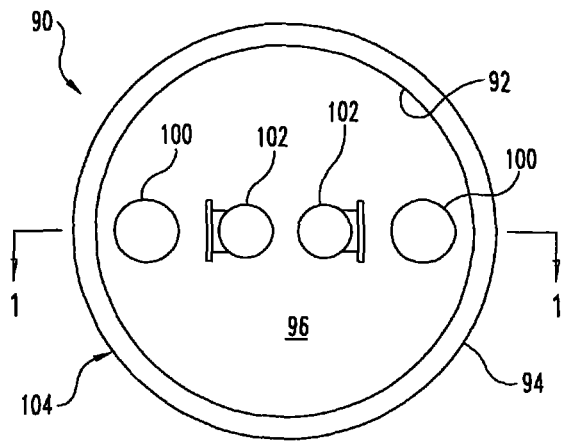
FIG. 4 is a top plan view of the lid 90 according to one version of the invention.

FIG. 4 illustrates the detachable lid 90 comprising an inner surface 92, an outer surface 94, a top surface 96, a bottom surface 98, two openings 100 for dispensing liquid, and two covers 102 for sealing the openings 100 to prevent the unwanted escape of liquid from the cup 60. The lid 90 may have at least one opening 100. The lid 90 may have at least one cover 102 for the openings 100. The lid 90 is sized to be removably secured to the second end 28 of the thermos bottle 20 and to the mouth 22 of the cup 60. The inner surface 92 and the outer surface 94 form a cylinder 104. The top surface 96 and the bottom surface 98 form a disc 106 extending about the radial center of the cylinder 104 such that the edges of disc 106 join with the inner surface 92 with cylinder 104 extending above and below the disc 106. The lid 90 may be rectangular, cubic, spherical, triangular, a pyramid, or any shape or combination thereof as may occur to one skilled in the art. The cylinder 104 formed by inner surface 92 and outer surface 94 may extend above but not below disc 106 formed by the top surface 96 and the bottom surface 98 or may extend below but not above the disc 96 formed by the top surface 96 and the bottom surface 98. The lid 90 may be composed of a polymer, glass, rubber, fiberglass, stone, wood, ceramic, metal, or any other rigid material or combination thereof as may occur to one skilled in the art.

When the lid 90 is being stored, the inner surface 92 of the lid 90 couples to the bottom end 28 of the thermos bottle 20. The lid 90 may be coupled to the bottom end 28 of the thermos bottle 20 by friction, threaded engagement, mechanically interlocking, or any other coupling means or combination thereof as may occur to one skilled in the art. The outer surface 94 or a recessed or projected surface 108 between the outer surface 94 and the inner surface 92 may be coupled to bottom end 28 of the thermos bottle 20, as shown in FIG. 5, by frictional engagement, threaded engagement, mechanical interlocking, or any other coupling means or combination thereof as may occur to one skilled in the art.

When the lid 90 is in use, the inner surface 92 of the lid 90 threadedly engages the inner surface 78 of the opening 64 of the cup 60 to couple the lid 90 to the cup 60. Alternatively, the lid 90 may be coupled to inner surface 78 and/or outer surface 80 of opening 64 by friction, mechanical interlocking, or any other coupling means or combination thereof as may occur to one skilled in the art. The outer surface 94 or a recessed or projected surface 108 between the outer surface 94 and the inner surface 92 may be coupled to the outer surface 80 or a projected or recessed surface respectively between the outer surface 80 and the inner surface 78, as shown in FIG. 5, by frictional engagement, threaded engagement, mechanical interlocking, or any other coupling means or combination thereof as may occur to one skilled in the art.

In operation, the cup 60 and the lid 90 are decoupled from the thermos bottle 20 by removing the cup 60 and the lid 90 from the thermos bottle 20. The cup 60 and the lid 90 may be detached from the thermos bottle 20 by threadedly disengaging, mechanically disengaging, or any other disengaging or uncoupling means depending on the version of the system 10. The cup 60 is then filled with liquid and the lid 90 is pressed onto the opening 64 of the cup 60 to prevent unwanted escape of liquid there from.

While the invention has been illustrated and described in detail in the drawings and foregoing description, the same is to be considered illustrative and not restrictive in character, it being understood that only selected embodiments have been shown and described and that all changes, equivalents, and modifications that come within the scope of the inventions described herein or defined by the following claims are desired to be protected.

What is claimed is:

1. A drink ware system comprising:
   a vessel for storing liquids having a first end, a mouth located at the first end, a second end, a first mechanical connection, a second mechanical connection, and a body comprised of an inner surface and an outer surface;

a removable stopper to prevent liquids contained within the vessel from escaping through the mouth;

a cup having an opening, an inside surface that forms a cavity, an outside surface, and a third mechanical connection, the cup being removably coupled to the first end of the vessel such that the cavity encloses the mouth of the vessel and the stopper; and a lid having a fourth mechanical connection being removably coupled to the second end of the vessel and to the opening of the cup when the cup and the lid are decoupled from the vessel.

2. The system of claim 1 wherein the vessel is elongated.

3. The system of claim 1 wherein the vessel has a smooth outer surface.

4. The system of claim 1 wherein the vessel includes at least one handle located on the outer surface.

5. The system of claim 4 wherein the handle is at least one annular recessed surface.

6. The system of claim 4 wherein the handle is at least one annular raised surface.

7. The system of claim 4 wherein the handle is at least one piece of material having a higher coefficient of friction than the outer surface of the vessel.

8. The system of claim 1 wherein the cup is elongated.

9. The system of claim 1 wherein the cup has a smooth outside surface.

10. The system of claim 1 wherein the cup includes at least one handle located on the outside surface.

11. The system of claim 10 wherein the handle is at least one annular recessed surface.

12. The system of claim 10 wherein the handle is at least one annular raised surface.

13. The system of claim 10 wherein the handle is at least one piece of material having a higher coefficient of friction than the outside surface of the cup.

14. The system of claim 1 wherein the third mechanical connection of the cup couples with the first mechanical connection on the first end of the vessel to couple the cup to the vessel.

15. The system of claim 14 wherein the third mechanical connection and first mechanical connection include threads.

16. The system of claim 14 wherein the third mechanical connection and first mechanical connection combine to produce a resilient force by elastically deforming the opening of the cup.

17. The system of claim 1 wherein the fourth mechanical connection of the lid couples with the second mechanical connection on the second end of the vessel to couple the lid to the vessel.

18. The system of claim 17 wherein the fourth mechanical connection and the second mechanical connection include threads.

19. The system of claim 17 wherein the fourth mechanical connection and the second mechanical connection combine to produce a resilient force by elastically deforming the lid.

20. The system of claim 1 wherein the third mechanical connection of the cup couples with the fourth mechanical connection of the lid to couple the lid to the cup.

21. The system of claim 20 wherein the third mechanical connection and the fourth mechanical connection include threads.

22. The system of claim 20 wherein the third mechanical connection and the fourth mechanical connection combine to produce a resilient force by elastically deforming the lid.

23. The system of claim 1 wherein the lid has at least one hole through the lid such that the hole is located over the opening of the cup when the lid is coupled to the cup and one cap that sealingly engages each hole.

24. A method of containing a liquid comprising:
   a. Depositing a liquid into a vessel through a mouth located at a first end of the vessel;
   b. removably coupling a stopper to the vessel to prevent liquid from escaping out the mouth of the vessel;
   c. removably coupling a cup to the first end of the vessel such that a cavity of the cup encloses the mouth of the vessel and the stopper; and
   d. removably coupling a lid to a second end the vessel.

25. A method of containing a liquid comprising:
   a. decoupling a cup from a first end of a vessel;
   b. decoupling a lid from a second end of the vessel;
   c. decoupling a stopper from a mouth at the first end of the vessel;
   d. depositing a liquid in a cavity of the cup through an opening in the cup; and
   e. removably coupling the lid to the opening of the cup.

* * * * *